United States Patent
Munroe et al.

(10) Patent No.: US 6,313,771 B1
(45) Date of Patent: Nov. 6, 2001

(54) CODES, METHODS, AND APPARATUS FOR OPTICAL ENCODING AND DECODING

(75) Inventors: Michael J. Munroe; Alan E. Johnson; Anders Grunnet-Jepsen; Eric S. Maniloff; Thomas W. Mossberg; John N. Sweetser, all of Eugene, OR (US)

(73) Assignee: Templex Technology, Inc., San Jose, CA (US)

( * ) Notice: Subject to any disclaimer, the term of this patent is extended or adjusted under 35 U.S.C. 154(b) by 0 days.

(21) Appl. No.: 09/442,086

(22) Filed: Nov. 17, 1999

(51) Int. Cl.[7] .................................................... H03M 1/34
(52) U.S. Cl. ............................................ 341/137; 359/121
(58) Field of Search .................................. 341/137, 131, 341/111, 155; 359/121, 184, 185; 385/24

(56) References Cited

U.S. PATENT DOCUMENTS

| | | |
|---|---|---|
| 3,568,167 | 3/1971 | Carson . |
| 3,896,420 | 7/1975 | Szabo . |
| 3,922,061 | 11/1975 | Glass et al. . |
| 4,101,976 | 7/1978 | Castro et al. . |
| 4,129,882 | 12/1978 | Limb . |
| 4,158,890 | 6/1979 | Burland . |
| 4,329,059 | 5/1982 | Pond et al. . |
| 4,387,955 | 6/1983 | Ludman et al. . |
| 4,459,682 | 7/1984 | Mossberg . |
| 4,474,427 | 10/1984 | Hill et al. . |

(List continued on next page.)

FOREIGN PATENT DOCUMENTS

| | | |
|---|---|---|
| 0 100 418 | 2/1984 | (EP) . |
| 0 231 629 | 12/1987 | (EP) . |
| 2 178 262 A | 2/1987 | (GB) . |
| 2 189 038 A | 10/1987 | (GB) . |

OTHER PUBLICATIONS

Babbitt, W.R. et al., Convolution, Correlation, and Storage of Optical Data in Inhomogeneously Broadened Absorbing Materials, *Advances in Optical Information Processing II*, pp. 240–247 (1986).

Babbitt, W.R. and Mossberg, T.W., "Mixed Binary Multiplication of Optical Signals by Convolution in an Inhomogeneously Broadened Absorber," *Applied Optics* 25:962–965 (1986).

Bai, Y.S. et al., "Real–Time Optical Waveform Convolver/Cross Correlator," *Appl. Phys. Lett.* 45:714–716 (1984).

Brady, D. et al., "Volume Holographic Pulse Shaping," *Optics Letters* 17: 610–612 (1992).

Carlson, N.W. et al., "Temporally Programmed Free–Induction Decay," *Physical Review A* 30:1572–1574 (1984).

Carter, T.P. et al., "Photon–Gated Spectral Hole Burning by Donor–Acceptor Electron Transfer," *Optics Letters* 12:370–372 (1987).

Chen, L.R. et al., "Ultrashort Pulse Propagation in Multiple–Grating Fiber Structures," *Optics Letters* 22:402–404 (1997).

(List continued on next page.)

*Primary Examiner*—Brian Young
(74) *Attorney, Agent, or Firm*—Klarquist Sparkman, LLP Campbell Leigh & Whinston LLP

(57) ABSTRACT

Encoders and decoders for applying composite codes to optical data signals include encoders and decoders for applying both subcodes and supercodes. The subcodes have a duration selected as less than or equal to an interchip duration or a chip duration of the supercodes. The encoders and decoders ("coders") include fiber Bragg gratings configured to encode or decode a subcode, a supercode, or a composite code. By coding with a subcode coder and a supercode coder, a coder is reconfigurable by selecting different subcodes or supercodes. Communication systems and methods using composite codes are also described.

27 Claims, 9 Drawing Sheets

U.S. PATENT DOCUMENTS

| | | |
|---|---|---|
| 4,533,211 | 8/1985 | Bjorklund et al. . |
| 4,655,547 | 4/1987 | Heritage et al. . |
| 4,670,854 | 6/1987 | Mossberg et al. . |
| 4,703,474 | 10/1987 | Foschini et al. . |
| 4,725,110 | 2/1988 | Glenn et al. . |
| 4,779,266 | 10/1988 | Chung et al. . |
| 4,866,699 | 9/1989 | Brackett et al. . |
| 4,867,522 | 9/1989 | Cassidy . |
| 4,941,733 | 7/1990 | Leib . |
| 5,073,980 | 12/1991 | Prucnal et al. . |
| 5,132,824 | 7/1992 | Patel et al. . |
| 5,136,666 | 8/1992 | Anderson et al. . |
| 5,166,818 | 11/1992 | Chase et al. . |
| 5,239,548 | 8/1993 | Babbitt et al. . |
| 5,276,637 | 1/1994 | Mossberg . |
| 5,315,423 | 5/1994 | Hong . |
| 5,337,382 | 8/1994 | Mizrahi . |
| 5,351,147 | 9/1994 | Frenkel . |
| 5,367,588 | 11/1994 | Hill et al. . |
| 5,377,288 | 12/1994 | Kashyap et al. . |
| 5,388,173 | 2/1995 | Glenn . |
| 5,467,212 | 11/1995 | Huber . |
| 5,568,301 | 10/1996 | Tiemann et al. . |
| 5,600,466 | 2/1997 | Tsushima et al. . |
| 5,608,825 | 3/1997 | Ip . |
| 5,638,473 | 6/1997 | Byron . |
| 5,668,901 | 9/1997 | Keck et al. . |
| 5,712,932 | 1/1998 | Alexander et al. . |
| 5,718,738 | 2/1998 | Kohnke et al. . |
| 5,726,785 | 3/1998 | Chawki et al. . |
| 5,737,106 | 4/1998 | Sansonetti et al. . |
| 5,742,416 | 4/1998 | Mizrahi . |
| 5,748,349 | 5/1998 | Mizrahi . |
| 5,748,350 | 5/1998 | Pan et al. . |
| 5,748,814 | 5/1998 | Painchaud et al. . |
| 5,760,941 | 6/1998 | Young et al. . |
| 5,761,351 | 6/1998 | Johnson . |
| 5,764,829 | 6/1998 | Judkins et al. . |
| 5,784,506 | 7/1998 | Pfeiffer . |
| 5,793,907 | 8/1998 | Jalali et al. . |
| 5,796,502 | 8/1998 | Haller, Jr. . |
| 5,812,318 | 9/1998 | Babbitt et al. . |
| 5,812,712 | 9/1998 | Pan . |
| 5,841,776 | 11/1998 | Chen . |
| 5,907,421 | 5/1999 | Warren et al. . |
| 5,987,197 | 11/1999 | Kersey . |
| 6,111,530 * | 8/2000 | Yun .................................... 341/137 |
| 6,175,320 * | 1/2001 | Heflinger ............................ 341/137 |

OTHER PUBLICATIONS

Dagani, R. "Photorefractive Polymers Poised to Play Key Role in Optical Technologies," *C&EN*, pp. 28–32 (1995).

Gagliardi, R.M. et al., "Fiber–Optic Digital Video Multiplexing Using Optical CDMA," *J. Lightwave Technol.* *11*:20–26 (1993).

Kachru, R., "Stimulated Echo Optical Memory," *Proceedings of the 3–D Memory Workshop*, pp. 64–67 (1990).

Macfarlane, R.M., "Photon–Echo Measurements on the Trivalent Thulium Ion," *Optics Letters 18*:1958–1960 (1993).

Macfarlane, R.M., "Spectral Hole Burning in the Trivalent Thulium Ion," *Optics Letters 18*:829–831 (1993).

Marhic, M.E., "Coherent Optical CDMA Networks," *J. Lightwave Technol. 11*:854–864 (1993).

Marom, E., "Optical Delay Line Matched Filters," *IEEE Trans. Circ. Syst. CAS–25*:360–364 (1978).

Mazurenko, Y.T., Interference of Spectrally Dispersed Light, *Opt. Spectrosc. 56*:357 (1984).

Mazurenko, Y.T., "Reconstruction of a Nonstationary Wave Field by Holography in a 3–D Medium," *Opt. Spectrosc. 57*:343–344 (1984).

Mazurenko, Y.T., Reconstruction of a Time–Varying Wavefront by Multibeam Interference, *Sov. Tech. Phys. Lett. 10*:228–229 (1984).

Mazurenko, Y.T., "Holography of Wave Packets," *Appl. Phys. B 50*:101–114 (1990).

Mossberg, T.W., "Time–Domain Frequency–Selective Optional Data Storage," *Optics Letters 7*:77–79 (1982).

Service, R., "Nonlinear Competition Heats Up," *Science 267*:1918–1921 (1995).

Vethanayagam, N. and MacDonald, R.I., "Demonstration of a Novel Optical Code–Division Multiple–Access System at 800 Megachips Per Second," *Optics Letters 16*:1010–1012 (1991).

Weiner, A.M. et al., "Femtosecond Spectral Holography," *J. Quantum Electronics 28*:2251–2261 (1992).

Winnacker et al., "Photon–Gated Hole Burning: A New Mechanism Using Two–Step Photoionization," *Optics Letters 10*:350–352 (1985).

* cited by examiner

CODES, METHODS, AND APPARATUS FOR OPTICAL ENCODING AND DECODING

FIELD OF THE INVENTION

The invention pertains to optical communication systems.

BACKGROUND OF THE INVENTION

Code-division-multiple-access (CDMA) methods have been used in satellite communication and wireless telephony. CDMA methods are spread-spectrum methods for multiplexing and demultiplexing a plurality of data-carrying electromagnetic signals onto a single transmission medium. These data signals are distinguished by encoding with different complex spectral or temporal codes. The resultant spectra of the encoded data signals are much broader than the spectra of the uncoded data signals. The number of data signals that can be successfully multiplexed and demultiplexed in a CDMA system is dependent on the complexity of the coding. CDMA codes are traditionally divided into "chips," defined as a temporal duration of the shortest temporal feature encoded onto the data signal. Larger numbers of chips permit larger numbers of users, or, alternatively, the less inter-user interference for a fixed number of multiplexed data signals.

Radio-frequency (RF) CDMA makes use of binary phase codes in which each chip assumes one of two values for the phase of the electromagnetic field that carries data signals. Such binary codes can be generated in real time with fast sequences of shift registers. Code-generation algorithms for the production of binary CDMA code sets include algorithms that generate Gold codes, Kasami codes, maximal sequence length codes, JPL codes, and Walsh codes.

One alternative to using these code sets is to generate new code sets with Monte Carlo or other code-search algorithms. However, as the number of code chips increases, the computational time of these algorithms becomes impractically long. This computational time is further increased if non-binary CDMA code sets are needed, i.e., codes having chips that assume more than two levels.

Optical CDMA systems use passive optical encoding and decoding with, for example, diffraction gratings. Since the coding and encoding are performed passively, no fast digital logic is needed to encode or decode the optical signal. Therefore, optical CDMA systems are not limited to the binary phase or amplitude codes used in RF CDMA.

Finding new code sets, particularly for use in optical communication systems can be difficult and time-consuming. Therefore, methods and apparatus for generating code sets and especially large-chip-number code sets having predictable cross-talk characteristics are needed. Also needed are encoders and decoders for encoding and decoding, respectively, an optical field or other electromagnetic signal using such codes.

DETAILED DESCRIPTION

Figure 1:
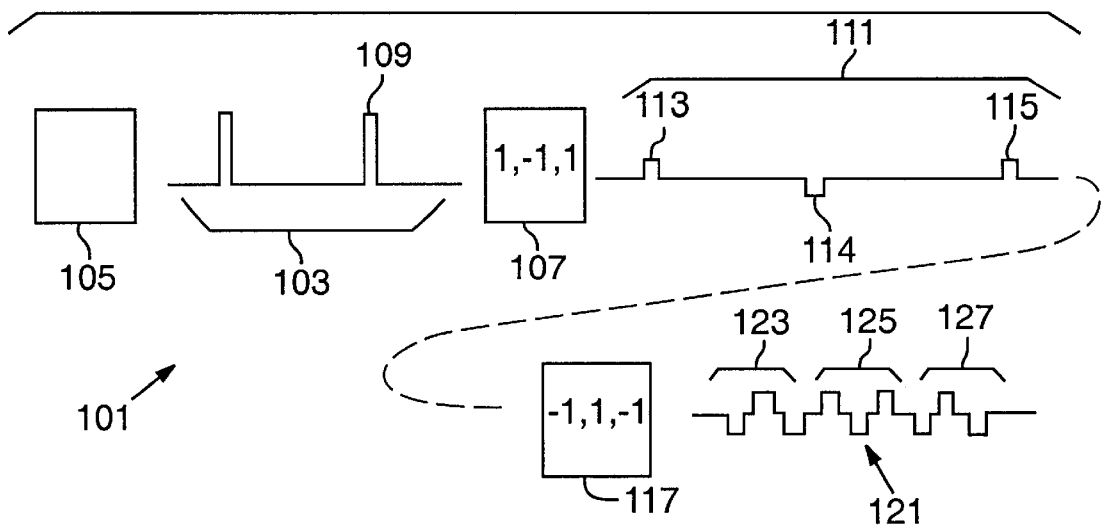
FIG. 1 is a schematic diagram of a data-transmission system using 3-chip supercodes and 3-chip subcodes.

FIG. 1 is a schematic of a data transmission system 101 that produces a data signal 103 from a data source 105. As shown in FIG. 1, the data signal 103 is represented as a binary, on-off modulation of an electromagnetic carrier such as an optical carrier. The on-off modulation is selected for convenience only, and other modulations can include phase, amplitude, intensity, and frequency modulation. In addition, non-binary modulation having more than two modulation levels can be used.

A supercode encoder 107 receives the data signal 103 and applies a predetermined code $R_i$ selected from a code set R to the data signal 103. For purposes of illustration, a code $R_i=\{1, -1, 1\}$ is selected and applied to a representative bit 109 of the data signal 103. As specified by the code R, the encoder 107 receives the bit 109 and transforms the bit into a "supercoded" bit packet 111. The supercoded bit packet 111 includes super-coded bits ("superbits") 113–115 that are relatively delayed by a delay time $T_{RC}$, wherein $T_{RC}$ is a supercode chip duration. In addition, the phase of the superbit 114 is inverted, while the phases of the superbits 113, 115 are unchanged. The encoder 107 applies the code $R_i$ to the entire data signal 103 to produce a supercoded data signal that is a sum of superbits corresponding to all respective bits of the data signal 103.

A subcode encoder 117 receives the supercoded data signal and applies a code $S_i$ selected from a code set S. For purposes of illustration, a code $S_i=\{-1, 1, -1\}$ is selected. The code $S_i$ is applied to the supercoded bit packet 111 to produce a combined subcoded and supercoded ("composite-coded") bit packet 121 that includes subcoded bits 123, 125, 127, corresponding to respective superbits 113, 114, 115. The encoder 117 encodes each of the supercoded bits 113–115 by relatively delaying portions by a delay time $T_{SC}$ wherein $T_{SC}$ is a subcode chip duration, and changing the phase of the supercoded bits 113, 115, to produce the corresponding subcoded bits 123, 125, 127. The encoder 117 applies the code $S_i$ to the supercoded data signal, producing a composite-coded data signal.

The encoders 107, 117 apply codes from respective sets R, S to the data signal 103. If the sets R, S contain $N_R$ and $N_S$ codes, respectively, then $N_R \times N_S$ different encodings are available. For example, if sets R, S each include 5 codes, then 25 encodings are possible. Thus, the number of available encodings increases as the product of $N_R$ and $N_S$ increases so that large numbers of encodings are possible even with small code sets. In addition, the sets R, S can be subsets of a large code set and can include different or identical codes. In this way, a set of N codes can be used to produce $N^2$ different encodings.

FIG. 1 illustrates encoding, with two sets of codes (sets R, S), but additional code sets can be used to further increase the number of available encodings. Subcode bits 113–115 can be further encoded with a code set Q having $N_Q$ codes, so that the number of available encodings is $N_R \times N_S \times N_Q$. Codes obtained by combining two or more code sets such as the code sets R, S are referred to herein as "composite codes."

The encoders 107, 117 can be electronic, acoustic, or optical encoders, depending on the type of signal to be encoded or decoded. Optical encoders are described in, for example, U.S. patent applications Ser. No. 09/354,851, TIME-WAVELENGTH MULTIPLE ACCESS OPTICAL COMMUNICATION SYSTEM AND METHOD, Ser. Nos. 09/115,331, 09/120,959, SEGMENTED COMPLEX FIBER GRATING, Ser. No. 09/115,331, SEGMENTED TASM GRATINGS, and U.S. Pat. No. 5,812,318 which are incorporated herein by reference.

The codes $R_i$, $S_i$ used above are selected as representative examples. More generally, codes include two or more "chips" that specify modulations to be applied to a signal. The chip modulations are applied to a signal at relative times differing by a chip duration $T_C$. Thus, a code and a chip duration specify an encoding of a data signal. A supercode is further specified by an interchip duration. A code R, having a total duration $T_R$, a number of chips $N_R$, and a chip duration $T_{RC}$, and a code S, having a total duration $T_S$, a number of chips $N_S$, and chip duration or interchip delay $T_{SC}$, are effectively orthogonal as decoded if $T_R \leq T_{SC}$. A composite code can be produced from the code R (a subcode), and from the code S (a supercode). The composite code has a given duration equal to the duration of the supercode and has a number of chips equal to the product of the number of chips of the subcode and the supercode. The chip duration is equal to the subcode chip duration. In the composite code, the subcode is repeated a number of times equal to the number of chips in the supercode.

Code sets and chip durations of supercodes and subcodes (and sub-subcodes) are preferably selected so that a data signal encoded with a particular composite code is decoded only with a matching decoding composite code. Decoding with an unmatched composite code produces only a noise-like background or low amplitude "sidelobes" or "crosstalk."

Given temporal orthogonality between a supercode and the subcode (i.e., low-amplitude cross-correlation and noise-like background), composite code sets of sufficient orthogonality can be generated from a code set with a small number of chips if the codes of the code set are sufficiently orthogonal. A code in a composite code set can be generated by using a selected code of the code set as a supercode and another selected code of the code set as a subcode. A composite code set comprises all combinations of supercodes and subcodes. For example, if a code set has M codes each containing $N_m$ chips, then the composite code set contains $M \times M$ codes each having $N_m \times N_m$ chips.

Figure 2A:
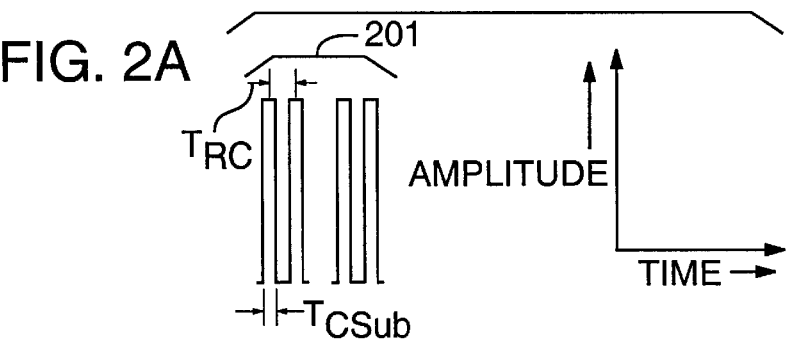
FIG. 2A is a schematic diagram of a subcode of an encoded data pulse.

FIG. 2A illustrates a single data bit after encoding with a 5-chip subcode that can be represented as $\{1, 1, 0, 1, 1\}$. The data bit is divided into five portions that are relatively delayed by a delay time $T_{RC}$. In this code, one portion, corresponding to "0", has no data-pulse amplitude.

Figure 2B:
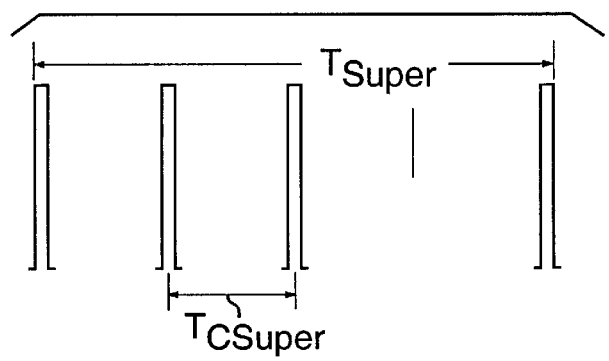
FIG. 2B is a schematic diagram of a supercode of an encoded data pulse.

FIG. 2B illustrates a data bit encoded with a 5-chip supercode that can be represented as $\{1, 1, 1, 0, 1\}$. The subcoded data bit is replicated once for each of the non-zero chips of the supercode and each subcoded bit is multiplied by a code value associated with a corresponding supercode chip. Both the supercode and subcode have temporal features of approximately the same duration, but the chip-spacing features are greater (for the supercode) than the duration of the entire subcode, so that $T_R \leq T_{SC}$, wherein $T_R$ is a duration of the subcode and $T_{SC}$ is a supercode chip spacing. The total duration of the subcode of FIG. 2A is less than or equal to the interchip spacing of the supercode.

Figure 2C:
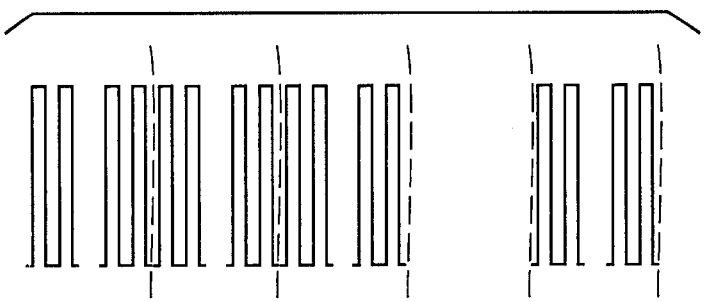
FIG. 2C is a schematic diagram of a composite-coded data pulse, obtained by combining the subcode of FIG. 2A with the supercode of FIG. 2B.

FIG. 2C illustrates a data bit after encoding with the subcode and supercode that produce the codings of FIGS. 2A–2B, respectively. The encoding of FIG. 2C is equivalent to encoding with a composite code defined by this subcode and supercode.

The procedure for generation of composite codes can be extended beyond the two sequential levels shown in FIG. 1 and FIGS. 2A–2C to include three or more levels to provide longer composite codes. Furthermore, composite code sets can be generated with code sets having different numbers of chips for the codes used to define the supercodes and subcodes.

Optical encoders and decoders for generating composite codes can include those disclosed in the references cited above. Using the linear spectral filtering techniques described in these references, composite codes can be optically encoded and decoded onto optical data streams. Representative encoders/decoders using optical circulators and reflective fiber Bragg gratings are discussed below. Other encoders/decoders use beam splitters, or diffraction gratings, to simultaneously encode or decode both a subcode and a supercode. In addition, a subcode and supercode can be encoded or decoded in any order, or simultaneously, and the subcoding and supercoding operations can be performed at a single location or at different locations.

Figure 2D:
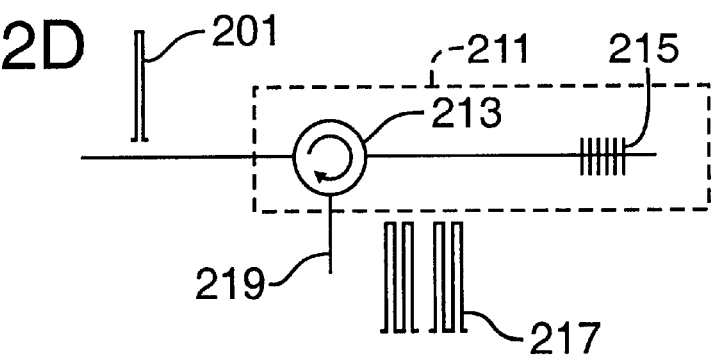
FIG. 2D is a schematic diagram of a subcode encoder that produces a subcode-encoded data pulse.
Figure 2E:
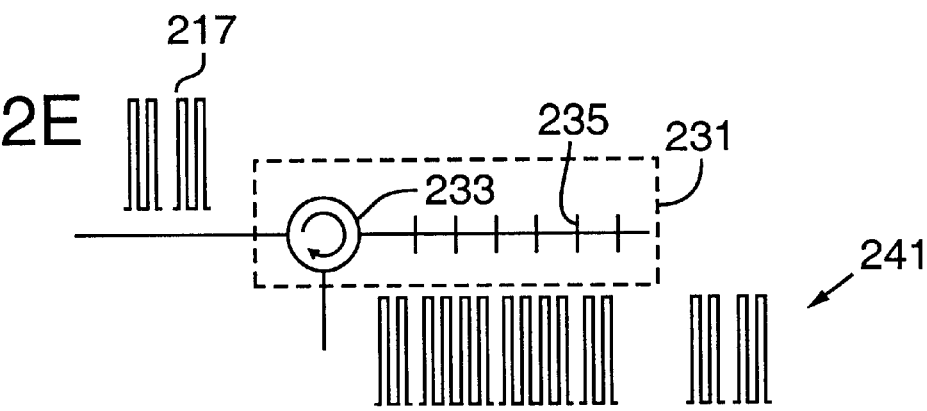
FIG. 2E is a schematic diagram of a supercode encoder that receives the subcode-encoded data pulse of FIG. 2D and produces a composite-coded data pulse.

FIGS. 2D–2E illustrate two-stage optical encoding using the codes of FIGS. 2A–2C. FIG. 2D shows a single incoming data pulse 201 that is received by a subcode encoder 211 comprising an optical circulator 213 and a fiber Bragg grating 215, selected to encode a selected subcode. A subcoded data pulse 217 exits the subcode encoder 211 through an exit port 219 of the optical circulator 213. As shown in FIG. 2E, a supercode encoder 231 receives the subcoded data pulse 217. The supercode encoder 231 comprises an optical circulator 233 and a fiber Bragg grating 235 that encodes a selected supercode. A data pulse 241 produced by the supercode encoder 231 is coded according to a composite code.

Figure 2F:
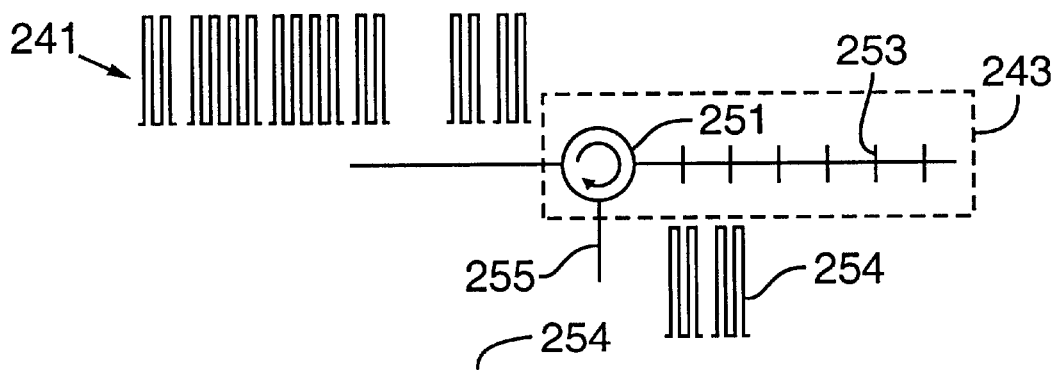
FIG. 2F is a schematic diagram of a supercode decoder that receives a composite-coded data signal and produces a subcoded data signal.
Figure 2G:
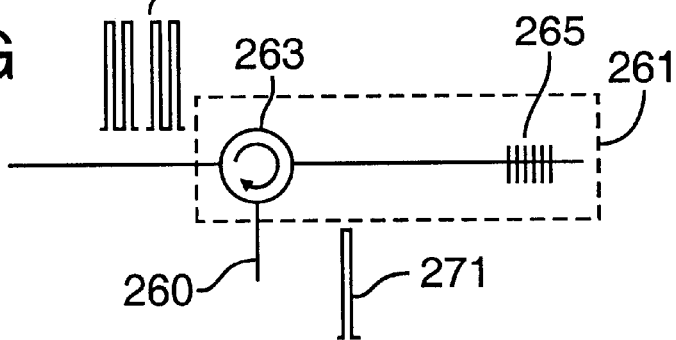
FIG. 2G is a schematic diagram of a subcode decoder that receives a supercoded data signal and produces a decoded data signal.

FIGS. 2F–2G illustrate two-stage optical decoding. FIG. 2F shows a supercode decoder 243 that receives the composite-code-encoded data pulse 241. The supercode decoder 243 comprises an optical circulator 251 and a fiber Bragg grating 253. The fiber Bragg grating 253 is selected to correspond to the supercode to be decoded. The fiber Bragg grating 253 removes the supercode from the data pulse 241 and a resulting supercode-decoded data pulse 254 exits via an exit port 255. The data pulse 254 corresponds to a subcode-encoded data pulse. If the fiber Bragg grating 253 decodes a supercode that does not match the supercode of the data pulse 241, then the output of the supercode decoder 243 is a noise-like, low-power signal.

FIG. 2G shows a subcode decoder 261 that receives the subcode-encoded data pulse 254. The subcode decoder 261 comprises an optical circulator 263 and a fiber Bragg grating 265 for decoding a selected subcode. A decoded data pulse 271 exits the subcode decoder through an exit port 260 of the optical circulator 263. If the data pulse 254 is encoded with a subcode that matches the fiber Bragg grating 265, then the subcode is stripped and the output of the subcode decoder 261 is a non-encoded optical data pulse. If the subcode of the data pulse 254 does not match that of the subcode decoder 261, then the output of the subcode decoder 261 is a noise-like, low-power signal.

Figure 3A:
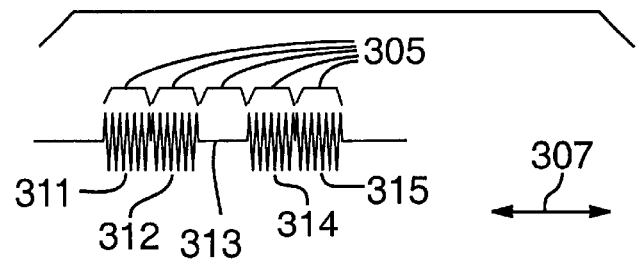
FIG. 3A is a schematic diagram of a fiber Bragg grating for encoding or decoding a subcode.

FIG. 3A is a schematic diagram of a segmented fiber Bragg grating ("fBg") 301 for encoding or decoding a subcode. The fBg 301 comprises grating segments 305 and fiber lengths 355. The grating segments 305 have periodic variations in an index of refraction of a fiber core or cladding, as discussed in U.S. patent application Ser. No. 09/120,959. The grating segments 305 and the fiber length 407 extend a length corresponding to a subcode chip time $T_{RC}$ along the direction 307. The fBg 301 has 5 chip segments 311–315 and encodes a code R={1, 1,0, 1, 1}.

Figure 3B:
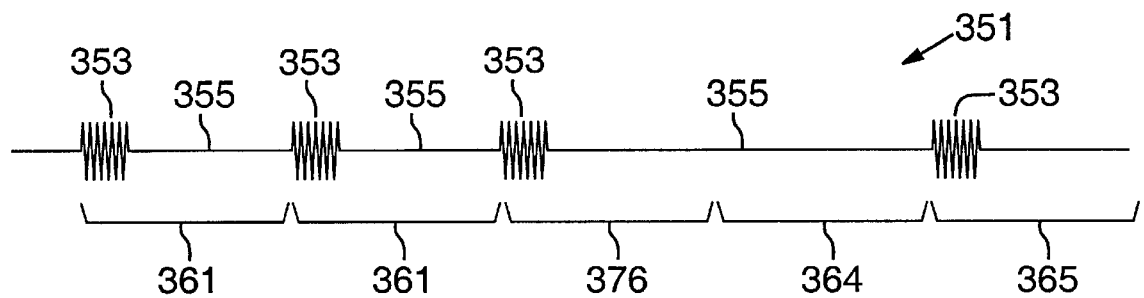
FIG. 3B is a schematic diagram of a fiber Bragg grating for encoding or decoding a supercode.

FIG. 3B is a schematic diagram of an fBg 351 for encoding or decoding a supercode. The fBg 351 comprises grating segments 353 and fiber lengths 355. The grating segments 353 have lengths corresponding to $T_{RC}$ of the fBg 351 but are separated by a length corresponding to a chip number times $T_{RC}$, i.e., 5$T_{RC}$ for the example. The fBg 351 encodes a 5-chip supercode and has 5 chip segments 361–365.

For efficient subcode and supercode encoding/decoding, grating segment lengths are approximately equal for a matched subcode and supercode fBg. In addition, the spatial period of the chip segments 361–365 of the supercode grating 351 is larger than the total length of the subcode grating 301. This guideline is a result of matching the bandwidths of the subcode and supercode fBgs. Also the total duration of a subcode is preferably less than or equal to the duration of a supercode chip (i.e., the chip segments 361–365). Similar guidelines apply to other linear spectral filtering devices used for encoding and decoding of subcodes and supercodes.

Figure 4:
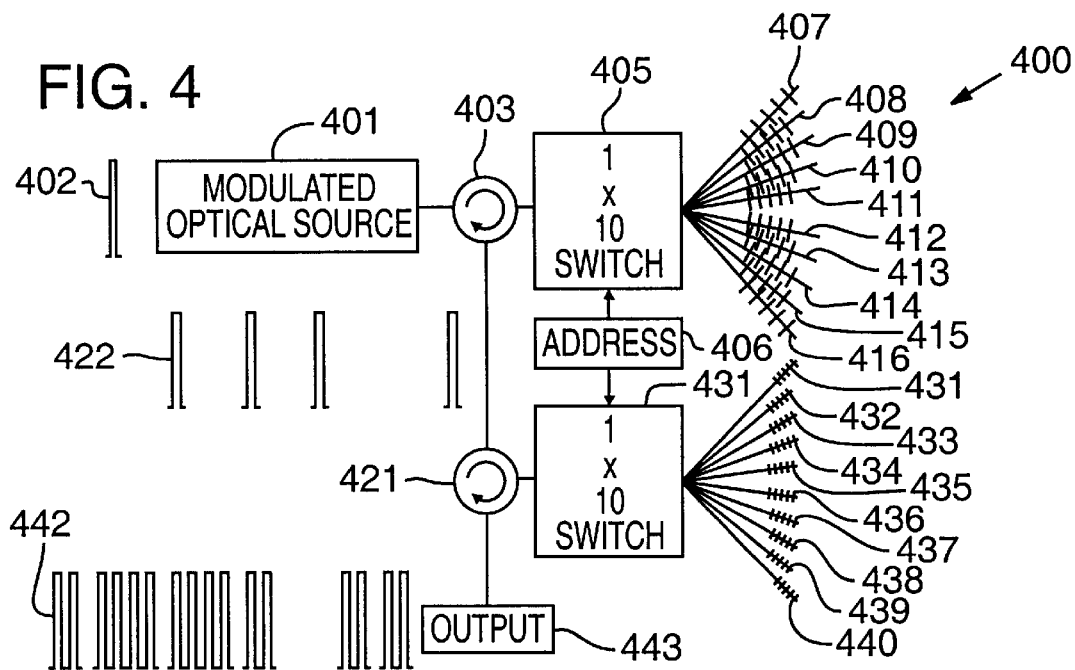
FIG. 4 is a schematic diagram of a reconfigurable encoder for applying a selected composite code.

FIG. 4 is a schematic diagram of a switched encoder 400 that can apply any of a hundred distinct composite codes onto an input data pulse. (A corresponding switched decoder has a similar construction.) The switched encoder 400 of FIG. 4 receives a single data pulse 402 or multiple data pulses from a modulated data source 401 at an optical circulator 403. The optical circulator 403 delivers the data pulse to a 1×10 switch 405 that selectively directs the data pulse to one of ten segmented fiber Bragg gratings 407–416 as controlled by an address selector 406. Each of the fiber Bragg gratings (fBgs) 407–416 is selected to encode a selected supercode.

After supercode encoding, the circulator 403 directs a supercoded data pulse 422 produced by the fBgs 407–416 to an optical circulator 421. The circulator 421 directs the pulse 422 to a 1×10 switch 431 that selects one of the subcoded fBgs 431–440 as directed by the address selector 406. A composite-code-encoded pulse is then produced and direct to an output 443 by the circulator 421. By selecting one each of the ten supercodes and subcodes (i.e., one each of the fBgs 407–416 and 431–440, respectively), 100 composite codes can be applied.

An N-chip code C is conveniently represented as a set {C1, . . . , CN} of complex or real chip modulations Ci to be applied to an optical signal. In addition to these chip modulations, a kth chip includes a modulation $\exp(-j\omega kT)$. For subcodes having temporally adjacent chips, $T=T_{chip}$ and for supercodes, $T=T_{Dchip}$, where $T_{Dchip}$ is a temporal chip spacing.

Figure 5A:
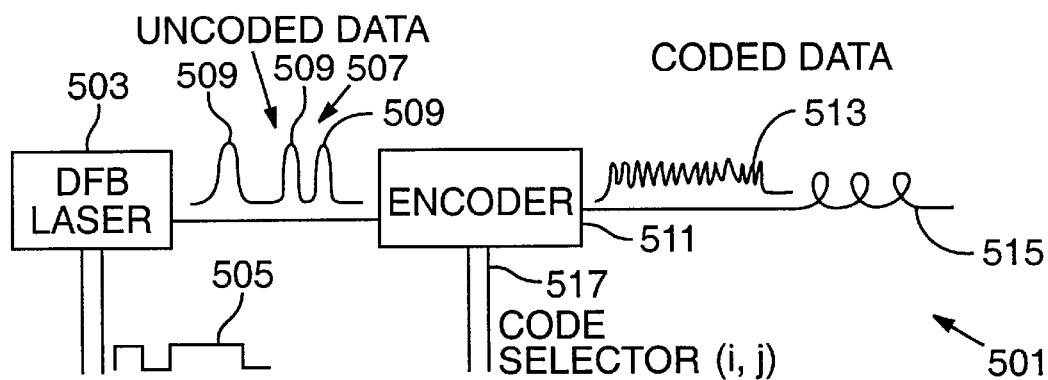
FIG. 5A is a schematic diagram of a transmitter that transmits optical signals coded with a composite code.

FIG. 5A is a schematic diagram of a representative transmitter 501 that comprises a distributed feedback (DFB) laser 503 that receives an electrical data signal 505 and produces an optical data signal 507. As shown in FIG. 5A, the electrical data signal 505 and the optical data signal 507 are binary amplitude-modulated signals. The optical data signal 507 produced by the DFB laser 503 comprises a series of laser pulses 509 or "bits" of duration of about $T_{pulse}$=25 ps and having an optical bandwidth $BW_{pulse}$ of about 35 GHz. The DFB laser 503 emits the laser pulses 509 at a repetition rate of about 2.5 Gbit/s. Each of the laser pulses typically corresponds to a "1" bit in the electrical data signal 505 and no laser pulses are emitted for the "0" bits. The DFB laser 503 can be used with an optical modulator so that the DFB laser 503 emits a series of laser pulses at a selected bit rate, and the modulator selectively absorbs or otherwise modulates the pulses according to the electrical data signal 505. An encoder 511 receives the optical data signal 507 and produces a composite-coded optical signal 513 that is transmitted on an optical fiber 515. The encoder includes a code-selection input 517 through which an ith subcode and a jth supercode are selected.

Figure 5B:
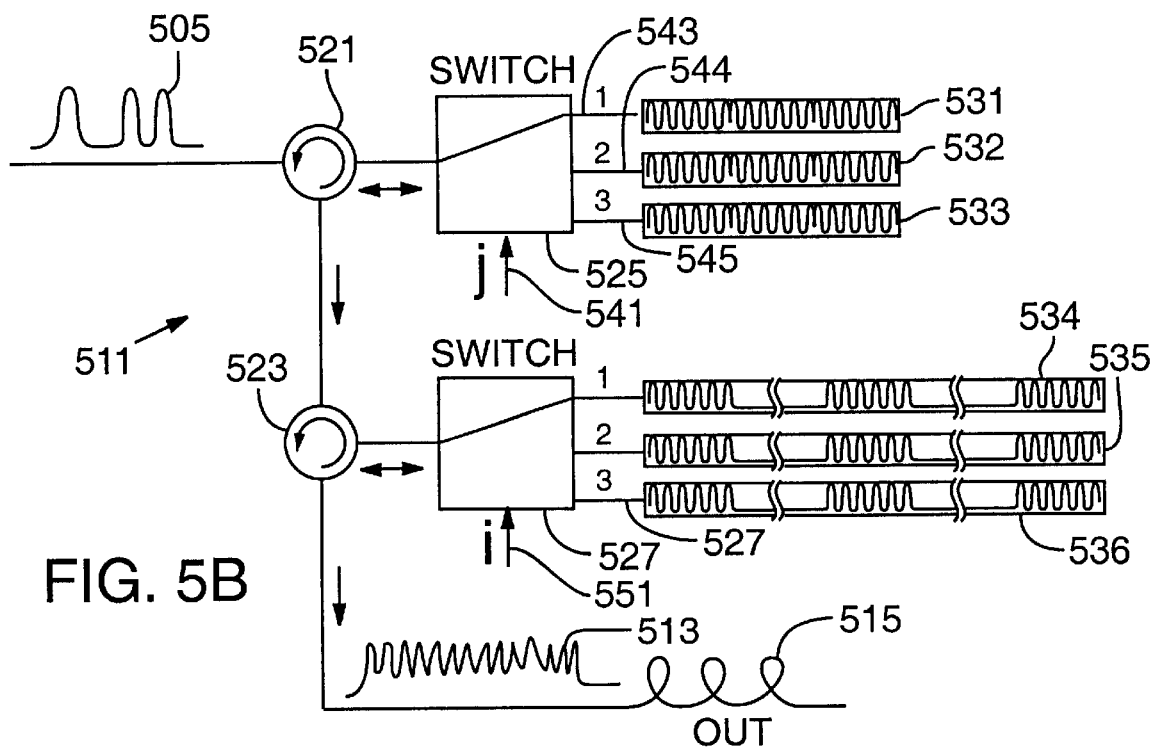
FIG. 5B is a schematic diagram of the reconfigurable encoder shown in FIG. 5A.

Referring to FIG. 5B, the encoder 511 comprises optical circulators 521, 523, optical switches 525, 527, and fiber Bragg gratings 531–536. The optical circulator 521 directs the optical data signal 505 to the optical switch 525. The optical switch 525 is responsive to an input 541 that directs the optical data pulse 505 to one of several output ports 543–545 (corresponding to j=1, 2, or 3 respectively). As shown in FIG. 5B, the optical switch 525 has three outputs 543–545 that connect to the fiber Bragg gratings 531–533, respectively. The fiber Bragg gratings 531–533 encode respective subcodes onto the input optical signal 505. The fiber Bragg grating 531 is selected (j=1) and reflects the optical signal 505 back to the circulator 521, producing a subcoded optical signal. The circulator 521 directs the subcoded optical signal to the circulator 523 that directs the subcoded optical signal to the optical switch 527. The optical switch 527 is responsive to an input 551 that permits selection of an ith supercode (for i=1, 2, 3) by selecting a corresponding fiber Bragg grating from the fiber Bragg gratings 534–536. In FIG. 5B, the supercode corresponding to i=1 is selected, i.e., corresponding to the fiber Bragg grating 534. The fiber Bragg grating 534 reflects the subcoded optical signal, producing a supercoded and subcoded (i.e., composite-coded) optical signal that is directed back to the optical switch 527, the optical circulator 523, and to a fiber 515.

In a presentative embodiment, a set of three 3-chip codes, $\{1, -1, 1\}$, $\{1, -1, -1\}$, and $\{1, 1, 1\}$ corresponding to i=j=1, 2, 3, respectively, is used for the subcodes and supercodes. Nine composite codes are formed from these codes, each of the nine codes comprising nine chips. The complete set of these nine nine-chip codes is:

TABLE 1

Composite codes produced with the 3-chip codes $\{1, -1, 1\}$, $\{1, -1, -1\}$, and $\{1, 1, 1\}$ used as both subcodes and supercodes.

| i | j | Code |
|---|---|---|
| 1 | 1 | $\{1, -1, 1, -1, 1, -1, 1, -1, 1\}$ |
| 1 | 2 | $\{1, -1, -1, -1, 1, 1, 1, -1, -1, 1\}$ |
| 1 | 3 | $\{1, 1, 1, -1, -1, -1, 1, 1, 1\}$ |
| 2 | 1 | $\{1, -1, 1, -1, 1, -1, -1, 1, -1\}$ |
| 2 | 2 | $\{1, -1, -1, -1, 1, 1, -1, 1, 1\}$ |
| 2 | 3 | $\{1, 1, 1, -1, -1, -1, -1, -1, -1\}$ |
| 3 | 1 | $\{1, -1, 1, 1, -1, 1, 1, -1, 1\}$ |
| 3 | 2 | $\{1, -1, -1, 1, -1, -1, 1, -1, -1\}$ |
| 3 | 3 | $\{1, 1, 1, 1, 1, 1, 1, 1, 1\}$ |

For the subcodes, a chip time delay $T_{sub}$ is selected that is less than or equal to the bit duration of the optical data signal, i.e., $T_{sub}$ is less than or equal to about 25 ps. For convenience, $T_{sub}$ is chosen to be 25 ps.

Figure 6A:
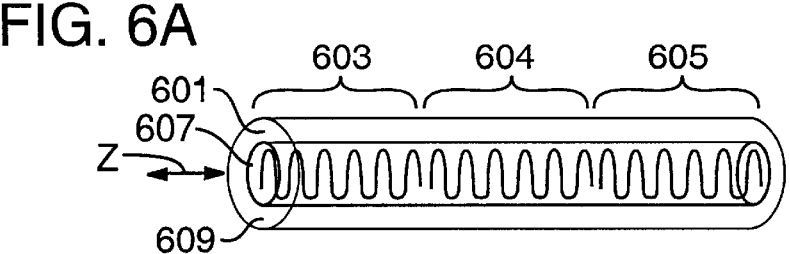
FIG. 6A is a schematic diagram of a fiber Bragg grating that encodes a subcode.

FIG. 6A is a schematic of a fiber Bragg grating 601, such as any of the fiber Bragg gratings 531–533, for encoding a subcode selected from the above 3-chip codes. The fiber Bragg grating 601 includes grating segments 603–605 that have respective periodic variations in refractive index in a core 607. In an alternative configuration, refractive-index variations can be provided in a cladding region 609. Optical signals propagate along a z-axis of the fiber Bragg grating 601.

Figure 6B:
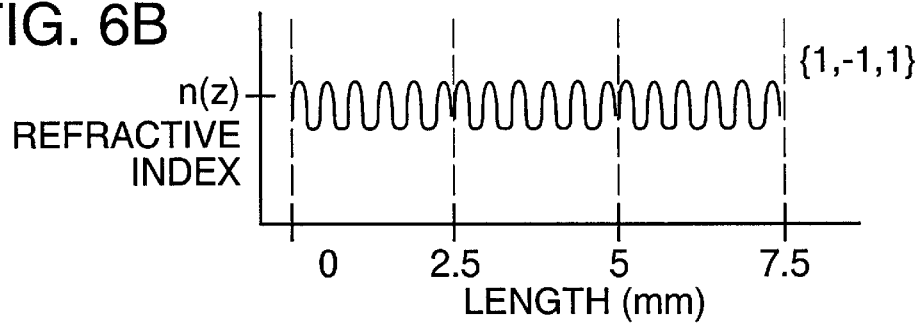
FIG. 6B is a graph of refractive-index variations as a function of position in the fiber Bragg grating of FIG. 6A.

FIG. 6B is a graph of refractive-index variations of the grating segments 603–605. In the fiber Bragg grating 601, an optical data signal propagates a distance L in a time t given by t=100 L ps/cm. (This relationship is typical of silica-based optical fibers). For a 3-chip subcode with $T_{sub}$=25 ps, each of the grating segments 603–605 of the fiber Bragg grating 601 are 2.5 mm long (25 ps/(100 ps/cm)), for a total length of 7.5 mm. Bragg gratings are defined in the segments 603–605 each having a periodic variation in refractive index of a period that depends on the wavelength $\lambda$ of the optical data signal and the refractive index $n_{core}$ of the fiber core 607. For telecommunications fibers $n_{core}$ is usually about $n_{core}$=1.5. For a DFB wavelength of 1550 nm, the grating period about 516 nm.

Figure 6C:
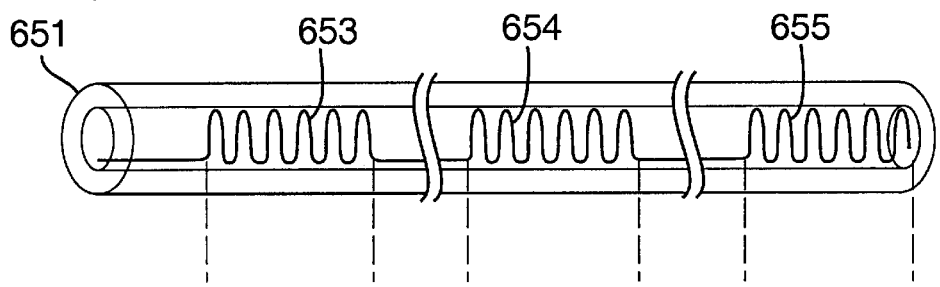
FIG. 6C is a schematic diagram of a fiber Bragg grating that encodes a supercode.
Figure 6D:
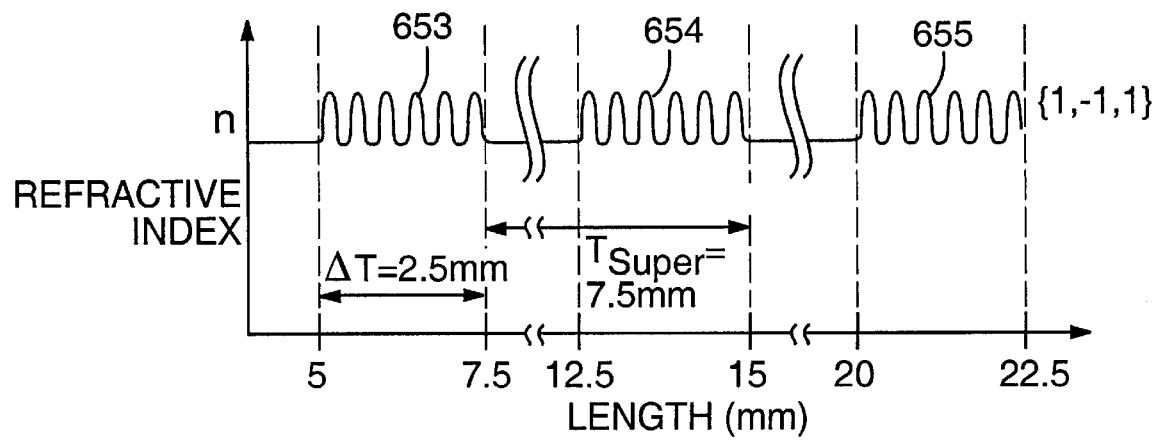
FIG. 6D is a graph of refractive-index variations as a function of position in the fiber Bragg grating of FIG. 6C.

The fiber Bragg grating 601 encodes an optical signal with a selected code based upon the relative phase shifts of the spatial variations in refractive index in the segments 603–605. As illustrated in FIG. 6B, the fiber segment 604 has a 180-degree phase shift with respect to fiber segments 603, 605 so that these segments correspond to the subcode $\{1, -1, 1\}$. (If an absolute phase reference is specified, this and other codes can be specified in terms of absolute phases as well as phase differences.) FIG. 6C is a schematic view of a fiber Bragg grating 651 for encoding a supercode (a supercode fiber), such as the fiber Bragg gratings 534–536. The supercode fiber 651 includes grating segments 653–655 having refractive-index variations selected based upon the laser pulse width and bandwidth. As shown in FIG. 6C, the grating segment lengths are selected to equal the subcode grating-segment lengths of 2.5 mm. The separation of the supercode grating segments is selected so that the time delay between adjacent chips is sufficient to span a subcoded laser pulse. Because the total duration of a subcode corresponds to a fiber Bragg grating length of 7.5 mm, the supercode grating segments have a 7.5-mm separation, corresponding to $T_{SC}$. The grating segments of the supercode grating 651 are similar to those of the subcode grating segments 603–605, having the same spatial period $\Lambda$ and the same relative phases, i.e., segment 654 is 180 degrees out of phase from segments 653, 655, but this phase difference is not shown in FIG. 6D.

Figure 7:
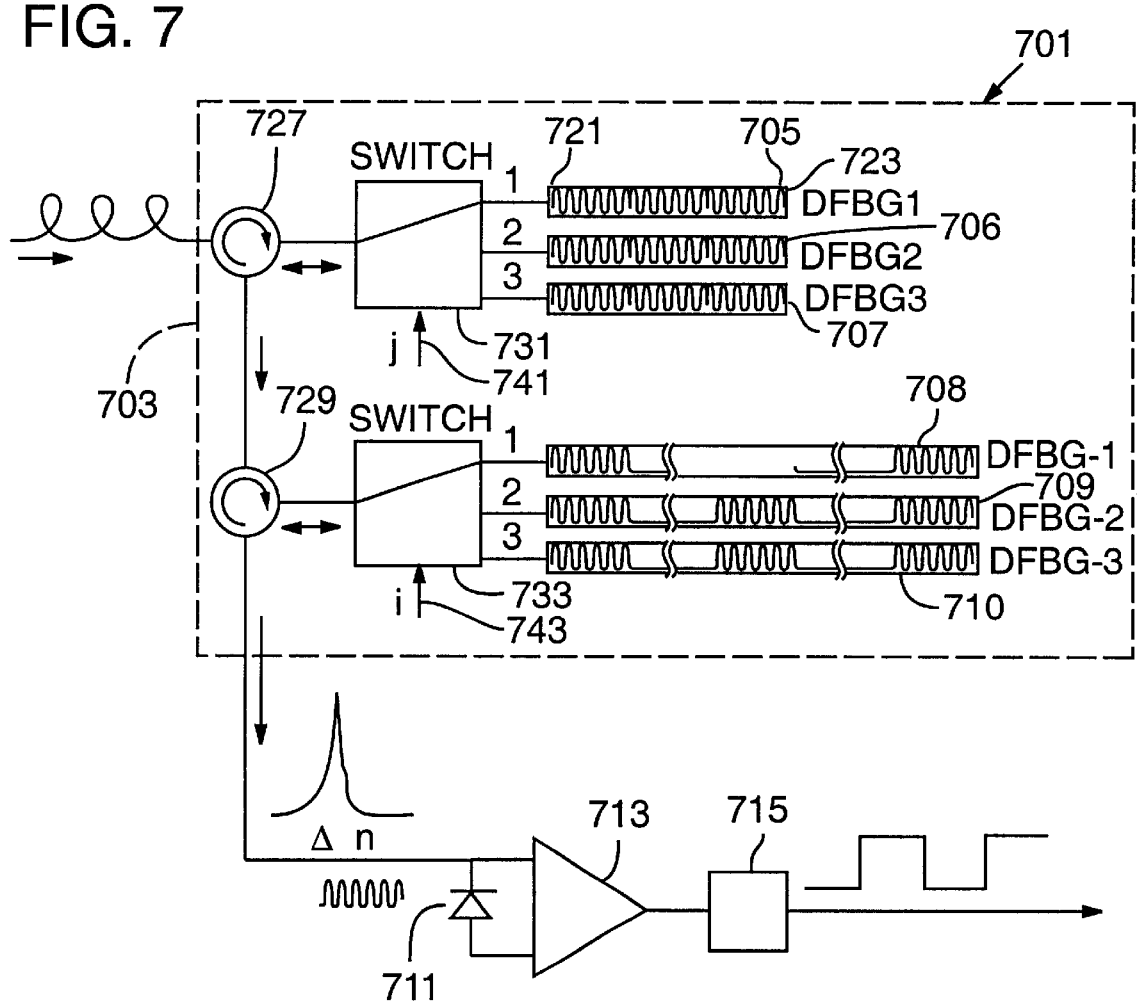
FIG. 7 is a schematic diagram of a receiver that decodes an optical signal coded with a composite code.

FIG. 7 is a schematic view of a receiver 701 that decodes and transduces a composite-coded optical signal produced by the encoder of FIG. 5B into an electrical signal. The receiver 701 comprises a decoder 703 that includes fiber Bragg gratings 705–710 that are selected to decode the composite codes encoded by the encoder of FIG. 5B. In addition, the receiver 701 comprises a photodetector 711, amplifier 713, and thresholding electronics 715. The photodetector 711 converts an optical signal into an electrical signal and the thresholding electronics 715 provide an electrical signal corresponding to the decoded optical signal with sidelobes and/or noise-like backgrounds attenuated.

The decoder fiber gratings 705–710 are selected to decode the composite codes (combined subcodes and supercodes) used by the encoder. The decoder fiber grating 705–710 corresponds to a code C used for encoding and corresponds to a code D, wherein $D_i = C_{nc-i}^*$. For fiber Bragg gratings having moderate or low grating-segment reflectivities, the decoder gratings are identical to the encoder gratings but with the optical signals to be coded and decoded input to the fiber Bragg gratings from different directions. For example, an end 721 of the fiber grating 705 is used as an input for decoding, and an end 723 is used as an input for decoding. Alternatively, the ends 721, 723 can be used as inputs for encoding and decoding, respectively.

The decoder 703 includes optical circulators 727, 729 and optical switches 731, 733. The optical switches are responsive to inputs that select a jth subcode and an ith supercode for decoding a composite code. Thus, the decoder 703 is reconfigurable. If reconfigurable coding is unnecessary, then a single fiber Bragg grating can be provided that encodes an optical signal with a composite code, and a single matched fiber Bragg grating can serve to decode this composite code. Providing separate fiber Bragg gratings for subcodes and supercodes is beneficial for reconfigurable coding.

Decoding of a code C (either a subcode or supercode) having N chips, i.e., $C=\{C_1, C_2, \ldots, C_N\}$ is accomplished with a code $D=\{D_1, D_2, \ldots, D_N\}$, wherein $D_i = C_{N-i}^*$, where "*" denotes complex conjugation. A decoded optical signal $E_{decode}$ is then a sum (or integral) over all chips so that $E_{decode} = \Sigma C_i D_{j-i}$. This sum is similar to an cross-correlation.

Figure 8A:
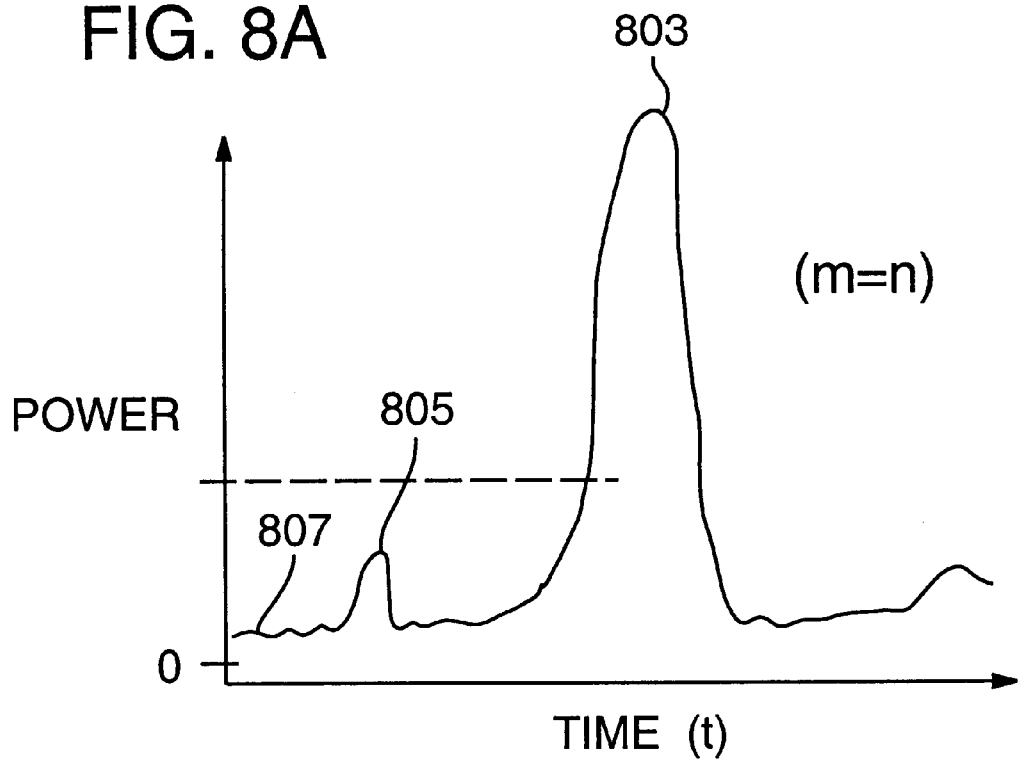
FIG. 8A is a graph of power as a function of time for an optical signal encoded and decoded with a matched composite code.
Figure 8B:
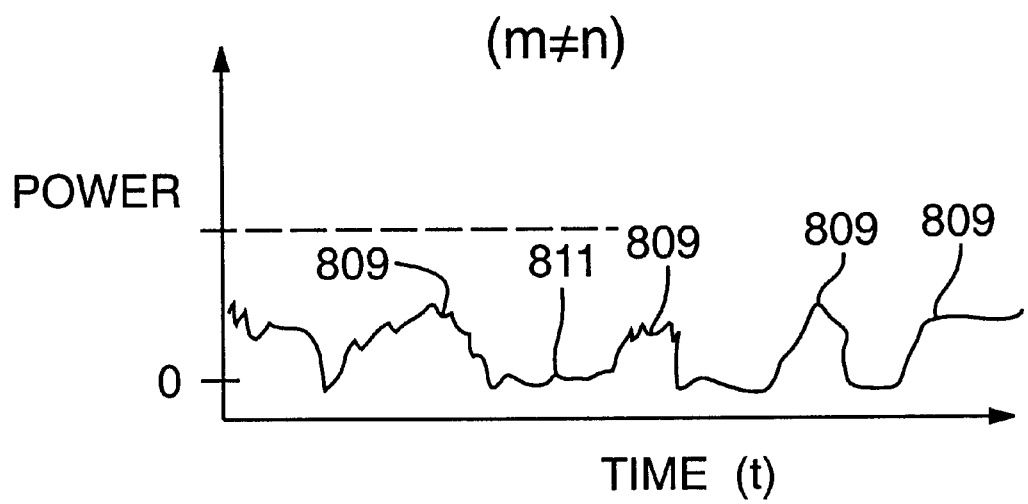
FIG. 8B is a graph of power as a function of time for an optical signal encoded and decoded with unmatched composite codes.

FIGS. 8A–8B illustrate decoded optical signals produced with a matched decoder and an unmatched decoder, respectively. The matched decoded output signal of FIG. 8A includes a correlation peak 803 corresponding to the input laser pulse. The matched decoded output also includes some power in one or more sidelobes 805 and a noise-like background 807. In contrast, the unmatched decoded output of FIG. 8B includes sidelobe peaks 809 superimposed on a noise-like background 811.

For purposes of illustration, configurable encoding and decoding is described above with reference to 3-chip and 5-chip codes. Larger numbers of chips and various coding methods (for example, phase codes or multilevel phase and/or amplitude codes) can be used. Codes having larger numbers of chips generally produce lower crosstalk (reduced sidelobe amplitude and noise-like background amplitude) and permit larger numbers of optical signals to be coded onto a single optical fiber. The higher numbers of channels requires fiber grating codes having larger numbers of grating segments, and can be more expensive and difficult to implement. For many applications, the number of channels is selected in consideration of these factors.

Figure 9A:
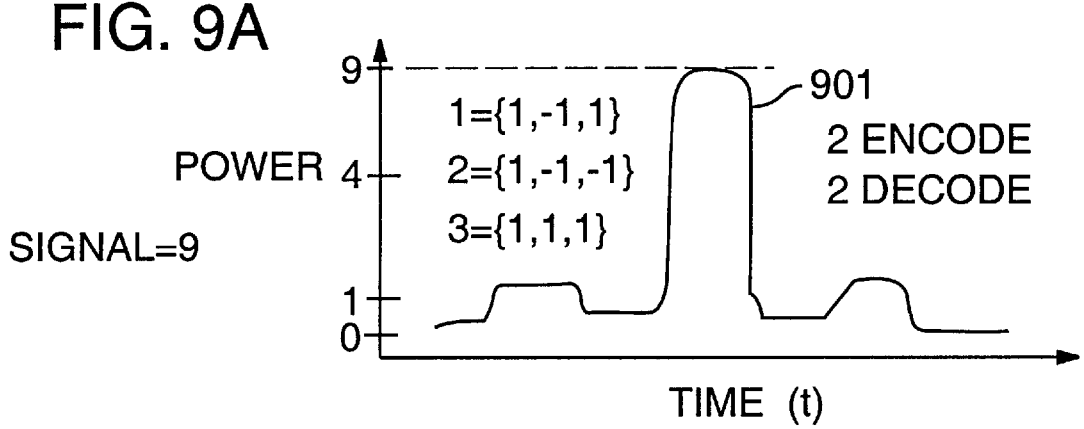
FIGS. 9A–9C are graphs of power as a function of time for encoding and decoding an optical signal with a matched code and with unmatched codes.
Figure 9B:
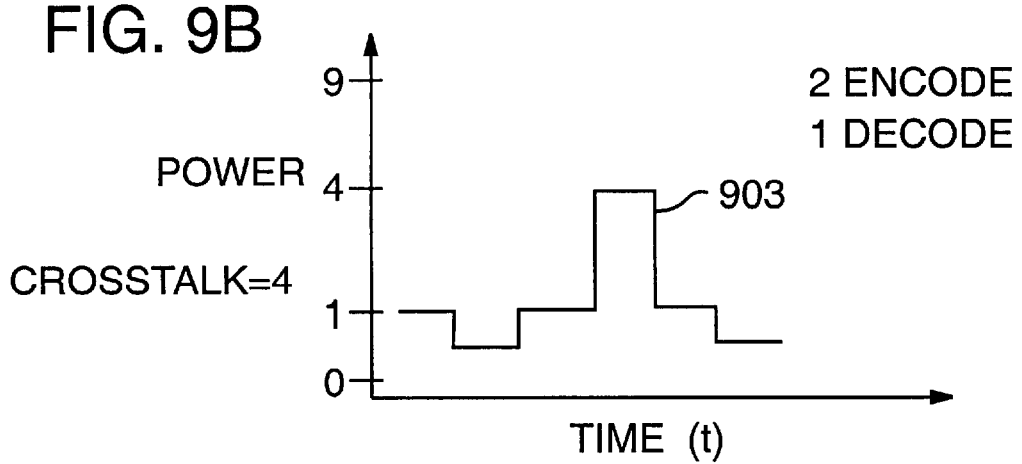
Figure 9C:
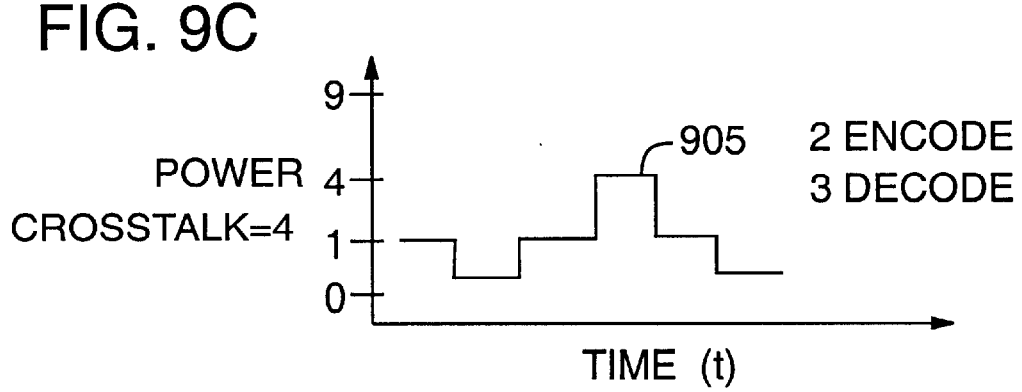

FIGS. 9A–9C illustrate decoded optical signals 901, 903, 905, respectively, produced by decoding a composite-coded optical signal (coded with $\{1, -1, -1\}$) with codes $\{1, -1, 1\}$, $\{1, -1, -1\}$, and $\{1, 1, 1\}$, respectively. A maximum power associated with decoding with an unmatched code is referred to as "crosstalk" or a "sidelobe." As shown in FIGS. 9A and 9C, the crosstalk for these codes is 4. A maximum power produced in decoding with a matched code is referred to as a decoded signal level. As shown in FIG. 9B, the decoded signal level for these codes is 9.

Figure 10A:
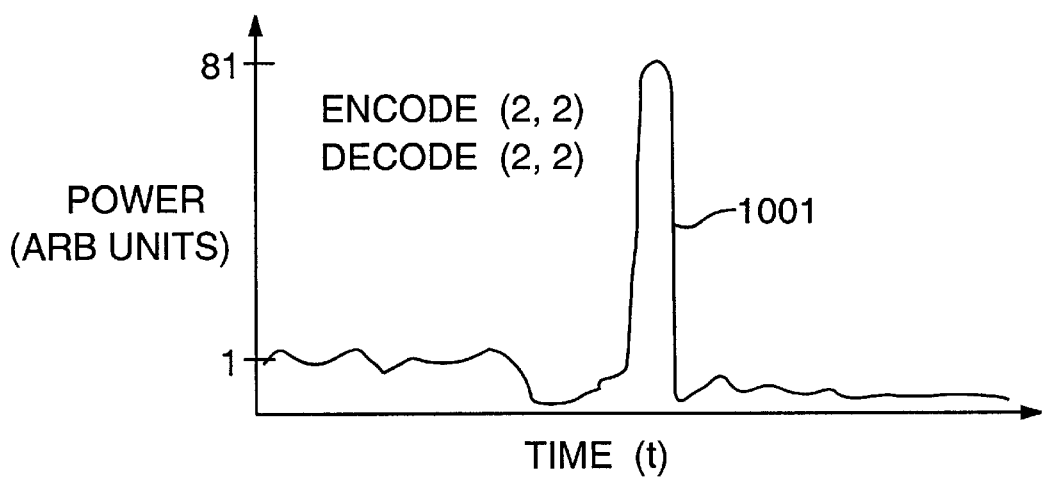
FIGS. 10A–10C are graphs of power as a function of time for encoding and decoding an optical signal with a matched composite code and with unmatched composite codes.
Figure 10B:
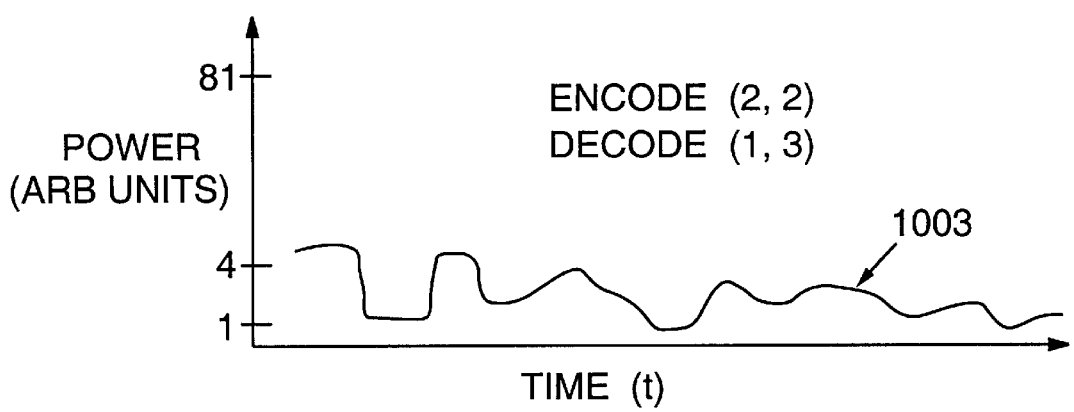
Figure 10C:
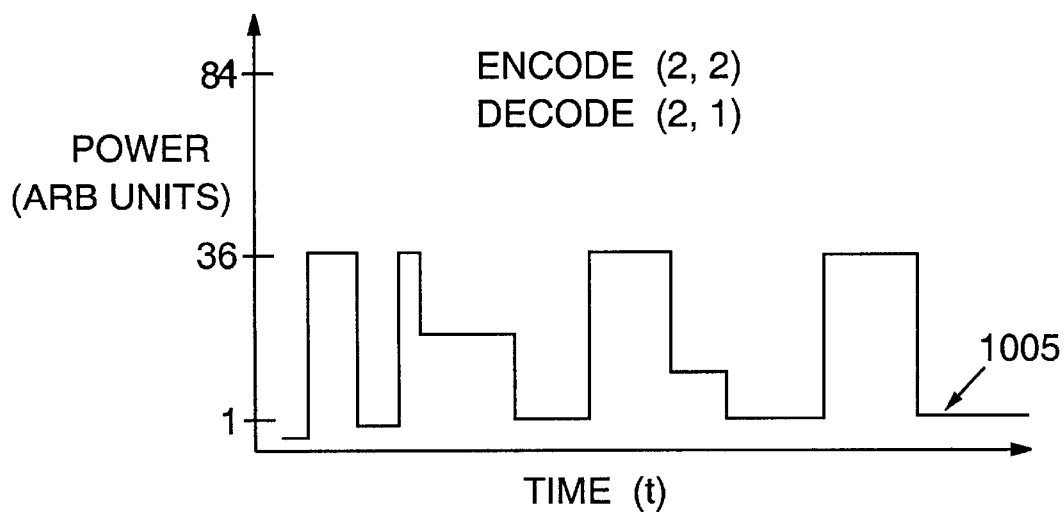

FIGS. 10A–10C illustrate decoded optical signals 1001, 1003, 1005, respectively, produced by decoding a composite-coded optical signal (coded with $\{1, -1, -1\}$) with codes $\{1, -1, 1\}$, $\{1, -1, -1\}$, and $\{1, 1, 1\}$, respectively. A maximum power associated with decoding with an unmatched code is referred to as "crosstalk" or a "sidelobe." As shown in FIG. 10C, the crosstalk for these codes is 36. A maximum power produced in decoding with a matched coded is referred to as a decoded signal level. As shown in FIG. 10A, the decoded signal level for these codes is 81. These longer codes do not necessarily produce an improved worst-case ratio of decoded signal to crosstalk, i.e. the worst-case ratio is 9:4, but in other cases the signal-to-crosstalk ratio is as large as 81:4. The worst-case ratio generally obtains for encoding and decoding with the same supercode but with a different subcode, or with the same subcode but a different supercode. For composite codes formed of three or more codes, the greater the number of code mismatches in encoding and decoding, the lower better the signal-to-crosstalk ratio.

For convenience above, "encoder" and "encoding" were used with reference to applying a code to an optical signal, and "decoder" and "decoding" were used with reference to removing or stripping a code from an optical signal. The terms "coder" and "coding" can be used to describe both applying and removing a code. In addition, decoding does not necessarily return an encoded optical data signal to its form prior to encoding, but removes the code sufficiently to permit data recovery from the optical data signal Nevertheless, as used herein, decoding is referred to as "removing" or "stripping" a code from an optical data signal.

Representative embodiments were discussed with respect to coding optical signals, but electric signals (such as radio-frequency signals) and acoustic signals can be similarly coded. Optical signals are typically described as electromagnetic radiation of wavelengths between about 100 nm and 0.1 mm, but longer and shorter wavelengths can be included. In addition, subcodes are illustrated in which there are no temporal gaps between chips. In general, time chips need not be adjacent.

Having illustrated and demonstrated the principles of the invention in a example embodiments, it should be apparent to those skilled in the art that these embodiments can be modified in arrangement and detail without departing from such principles. We claim as the invention all that comes within the scope of these claims.

We claim:

1. A coder for coding a signal with a composite code, the coder comprising:
   a subcode encoder situated and configured to receive the signal and apply a subcode to the signal; and
   a supercode encoder situated and configured to receive the signal and apply a supercode to the signal, wherein the total duration of the subcode is less than or equal to an interchip spacing of the supercode.

2. The code of claim 1, wherein the signal is an optical signal.

3. The coder of claim 2, wherein the subcode encoder is situated and configured to direct the optical signal to the supercode encoder after applying the subcode.

4. The coder of claim 2, wherein the supercode encoder is situated and configured to direct the optical signal to the subcode encoder after applying the supercode.

5. The coder of claim 2, wherein the supercode has a number of chips $N_{Csuper}$ and the subcode has a number of chips $N_{sub}$, wherein $N_{sub}$ is not equal to $N_{Csuper}$.

6. The coder of claim 2, wherein the supercode encoder includes a fiber Bragg grating.

7. The coder of claim 2, wherein the subcode encoder includes a fiber Bragg grating.

8. A reconfigurable coder that applies a composite code to an optical data signal, the coder comprising:
   a plurality of coders corresponding to respective subcodes;
   a plurality of coders corresponding to respective supercodes;
   an optical switch; and
   an optical addressor that selects a composite code by configuring the optical switch so that the optical data signal is coded by at least a selected one of the plurality of subcodes and a selected one of the plurality of supercodes, wherein the optical addressor designates the selected subcode and the selected supercode.

9. The reconfigurable coder of claim 8, wherein the plurality of coders corresponding to subcodes are respective fiber Bragg gratings.

10. The reconfigurable coder of claim 8, wherein the plurality of coders corresponding to supercodes are respective fiber Bragg gratings.

11. The reconfigurable coder of claim 8, wherein the subcodes have durations that are less than or equal to an interchip duration of the supercodes.

12. A method of encoding a data signal, comprising:
   applying a subcode to the signal, the subcode including $N_{sub}$ code chips of duration $T_{Csub}$; and
   applying a supercode to the signal, either prior to or after the subcode is applied, the supercode including $N_{super}$ chips of duration $T_{Csuper}$.

13. The method of claim 12, wherein the signal is an optical signal.

14. The method of claim 13, wherein $(N_{sub}) T_{Csub}$ is less than or equal to $T_{Csuper}$.

15. The method of claim 14, further comprising:
   selecting a code; and
   defining the supercode and subcode based on the code.

16. A method of reconfigurably coding an optical data signal, comprising:
   selecting a set of codes for use as supercodes;
   selecting a set of codes for use as subcodes; and
   forming a set of composite codes based on the set of subcodes and the set of supercodes; and applying at least one of the composite codes to the optical data signal.

17. The method of claim 16, further comprising determining an interchip duration for a supercode to be greater than or equal to a duration of a subcode.

18. The method of claim 16, wherein the code sets selected for use as supercodes and subcodes are the same.

19. The method of claim 16, further comprising providing fiber Bragg gratings for applying a subcode portion of the composite codes.

20. The method of claim 16, further comprising providing fiber Bragg gratings for applying a supercode portion of the composite codes.

21. A method of coding an optical signal with a composite code, comprising:

applying to the optical signal a subcode R having a total duration $T_{sub}$, a number of chips $N_{sub}$, and a chip duration $T_{Csub}$; and applying a supercode S having a total duration $T_{super}$, a number of chips $N_{super}$, and a chip duration $T_{Csuper}$, wherein $T_{sub} \leq T_{Csuper}$, wherein applying the subcode R and the supercode S encodes the optical signal with the composite code.

22. The method of claim 21, further comprising selecting the subcode R and the supercode S to strip a composite code from the optical signal.

23. The method of claim 21, wherein the composite code has a number of chips equal to $(N_{sub})(N_{super})$.

24. The method of claim 21, further comprising selecting a set of sub-subcodes having a duration less than or equal to a duration of a subcode.

25. A system for transmitting and receiving an optical data signal, comprising:

an encoder situated and configured for applying a composite code to the optical data signal;

a transmission medium situated and configured to receive the optical data signal to which the composite code is applied; and a decoder for stripping the composite code from the optical data signal.

26. The system of claim 25, wherein the encoder is reconfigurable to encode a set of composite codes.

27. The system of claim 26, wherein the encode includes a set of fiber Bragg gratings for encoding the set of composite codes.

* * * * *